(12) United States Patent
Fasola et al.

(10) Patent No.: US 12,221,119 B2
(45) Date of Patent: Feb. 11, 2025

(54) DRIVE-THROUGH CALIBRATION PROCESS

(71) Applicant: GM Cruise Holdings LLC, San Francisco, CA (US)

(72) Inventors: Juan Fasola, San Francisco, CA (US); Ankit Rohatgi, Pacifica, CA (US); Alexandri Zavodny, San Francisco, CA (US); Zhizhong Yan, San Francisco, CA (US); Pragya Agrawal, Sunnyvale, CA (US); Mayur Shah, Pleasanton, CA (US); Syed Aziz Enam, Fremont, CA (US); Morgan Wessel, San Francisco, CA (US); Joseph Thibeault, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 283 days.

(21) Appl. No.: 17/862,856

(22) Filed: Jul. 12, 2022

(65) Prior Publication Data

US 2024/0017731 A1    Jan. 18, 2024

(51) Int. Cl.
*B60W 50/02* (2012.01)
*G01S 7/40* (2006.01)
(Continued)

(52) U.S. Cl.
CPC ....... *B60W 50/0205* (2013.01); *G01S 7/4026* (2013.01); *G01S 7/4972* (2013.01);
(Continued)

(58) Field of Classification Search
CPC ..... B60W 50/0205; B60W 2050/0215; B60W 2420/403; B60W 2420/408;
(Continued)

(56) References Cited

U.S. PATENT DOCUMENTS

| 5,331,578 | A | * | 7/1994 | Stieler | G01C 21/188 |
| | | | | | 73/866.5 |
| 9,338,447 | B1 | * | 5/2016 | Crump | H04N 17/02 |

(Continued)

FOREIGN PATENT DOCUMENTS

| CN | 113947769 | A | * | 1/2022 | |
| FR | 3062507 | A1 | * | 8/2018 | G01S 17/86 |

OTHER PUBLICATIONS

Accelerometer calibration: a step-by-step guide (Year: 2022).*
(Continued)

*Primary Examiner* — Thomas Ingram
*Assistant Examiner* — Faris Asim Shaikh
(74) *Attorney, Agent, or Firm* — Dimitri Kirimis

(57) ABSTRACT

System, methods, and computer-readable media for a calibration check process of sensors on an autonomous vehicle (AV) via a drive-through environment mapped with a series of targets. The targets are used to check the calibration of the sensors on the AV as a quality check before the AV is determined fit to drive autonomously. Supervising a calibration process that collects data from the sensors on the AV based on exposure to a series of targets or augmented camera targets. The collected data may be used for extrinsic calibration aimed to determine that extrinsic parameters that define the rigid relationship between sensors are in set checker bounds.

9 Claims, 5 Drawing Sheets

(51) Int. Cl.
  *G01S 7/497* (2006.01)
  *G06T 7/80* (2017.01)
  *G06V 20/58* (2022.01)
  *G07C 5/00* (2006.01)

(52) U.S. Cl.
  CPC .............. *G06T 7/80* (2017.01); *G06V 20/584* (2022.01); *G07C 5/008* (2013.01); *B60W 2050/0215* (2013.01); *B60W 2420/403* (2013.01); *B60W 2420/408* (2024.01); *B60W 2520/06* (2013.01); *B60W 2554/802* (2020.02); *B60W 2555/60* (2020.02); *G06T 2207/30252* (2013.01)

(58) Field of Classification Search
  CPC ....... B60W 2520/06; B60W 2554/802; B60W 2555/60; G01S 7/4026; G01S 7/4972; G01S 7/4091; G01S 13/865; G01S 13/931; G01S 17/86; G01S 17/87; G01S 17/931; G06T 7/80; G06T 2207/30252; G06T 7/0018; G06T 7/002; G06V 20/584; G07C 5/008; H04N 17/002
  See application file for complete search history.

(56) References Cited

U.S. PATENT DOCUMENTS

| | | | | |
|---|---|---|---|---|
| 10,247,576 | B2* | 4/2019 | Heide | G01D 3/08 |
| 11,494,973 | B2* | 11/2022 | Boyadzhiev | G01C 21/206 |
| 11,756,231 | B2* | 9/2023 | Chen | B25J 5/007 |
| | | | | 348/135 |
| 11,940,277 | B2* | 3/2024 | Roumeliotis | G06T 7/73 |
| 2015/0317781 | A1* | 11/2015 | Napier | G06T 7/85 |
| | | | | 348/46 |
| 2017/0169627 | A1* | 6/2017 | Kim | G01S 13/862 |
| 2018/0045536 | A1* | 2/2018 | Kümmerle | G01S 17/08 |
| 2018/0190046 | A1* | 7/2018 | Levinson | G01S 7/4972 |
| 2018/0231385 | A1* | 8/2018 | Fourie | G01C 21/188 |
| 2019/0156515 | A1* | 5/2019 | Deng | G06T 7/75 |
| 2019/0163189 | A1* | 5/2019 | Jensen | G05D 1/0272 |
| 2019/0219697 | A1* | 7/2019 | Castorena Martinez | |
| | | | | G01S 17/86 |
| 2019/0227177 | A1* | 7/2019 | Zalewski | G01S 19/396 |
| 2019/0244378 | A1* | 8/2019 | Dong | G06T 5/80 |
| 2019/0258251 | A1* | 8/2019 | Ditty | G06V 20/58 |
| 2019/0368879 | A1* | 12/2019 | Roumeliotis | G06T 7/277 |
| 2020/0098135 | A1* | 3/2020 | Ganjineh | G06T 7/11 |
| 2020/0242396 | A1* | 7/2020 | Holz | G05D 1/0234 |
| 2020/0302708 | A1* | 9/2020 | Thompson | G07C 5/0825 |
| 2020/0319297 | A1* | 10/2020 | Bruns | G01S 17/931 |
| 2020/0355503 | A1* | 11/2020 | Chen | G01P 15/08 |
| 2020/0371241 | A1* | 11/2020 | Biber | G01S 7/4817 |
| 2020/0410715 | A1* | 12/2020 | Cadien | G01S 13/867 |
| 2021/0172762 | A1* | 6/2021 | Max | G01C 25/005 |
| 2021/0303898 | A1* | 9/2021 | Wang | G06V 20/10 |
| 2022/0036732 | A1* | 2/2022 | Chen | G01C 21/3811 |
| 2022/0130145 | A1* | 4/2022 | Connary | G06T 15/20 |
| 2022/0141375 | A1* | 5/2022 | Herman | H04W 4/40 |
| | | | | 348/226.1 |
| 2022/0194412 | A1* | 6/2022 | Zhang | G06V 20/56 |
| 2022/0262173 | A1* | 8/2022 | Wu | B60W 60/00 |
| 2022/0358679 | A1* | 11/2022 | Chen | G06T 7/73 |
| 2022/0392232 | A1* | 12/2022 | Aguiar | G01S 7/4972 |
| 2023/0032420 | A1* | 2/2023 | Revaud | G06T 7/277 |
| 2023/0066919 | A1* | 3/2023 | Navin | B60W 30/02 |
| 2023/0147480 | A1* | 5/2023 | Rohatgi | G06V 20/56 |
| | | | | 382/104 |
| 2023/0176577 | A1* | 6/2023 | Ditty | G05D 1/0274 |
| | | | | 701/23 |
| 2023/0221125 | A1* | 7/2023 | Nachstedt | G01C 21/30 |
| | | | | 701/445 |

OTHER PUBLICATIONS

Translation of FR-3062507-A1 retrieved from Espacenet on Apr. 18, 2024 (Year: 2024).*

Translation of CN-113947769-A retrieved from Espacenet on Apr. 18, 2024 (Year: 2024).*

\* cited by examiner

DRIVE-THROUGH CALIBRATION PROCESS

TECHNICAL FIELD

The subject technology relates to a calibration process of sensors on an autonomous vehicle (AV), and more specifically, a drive-through calibration process that can be remotely supervised.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
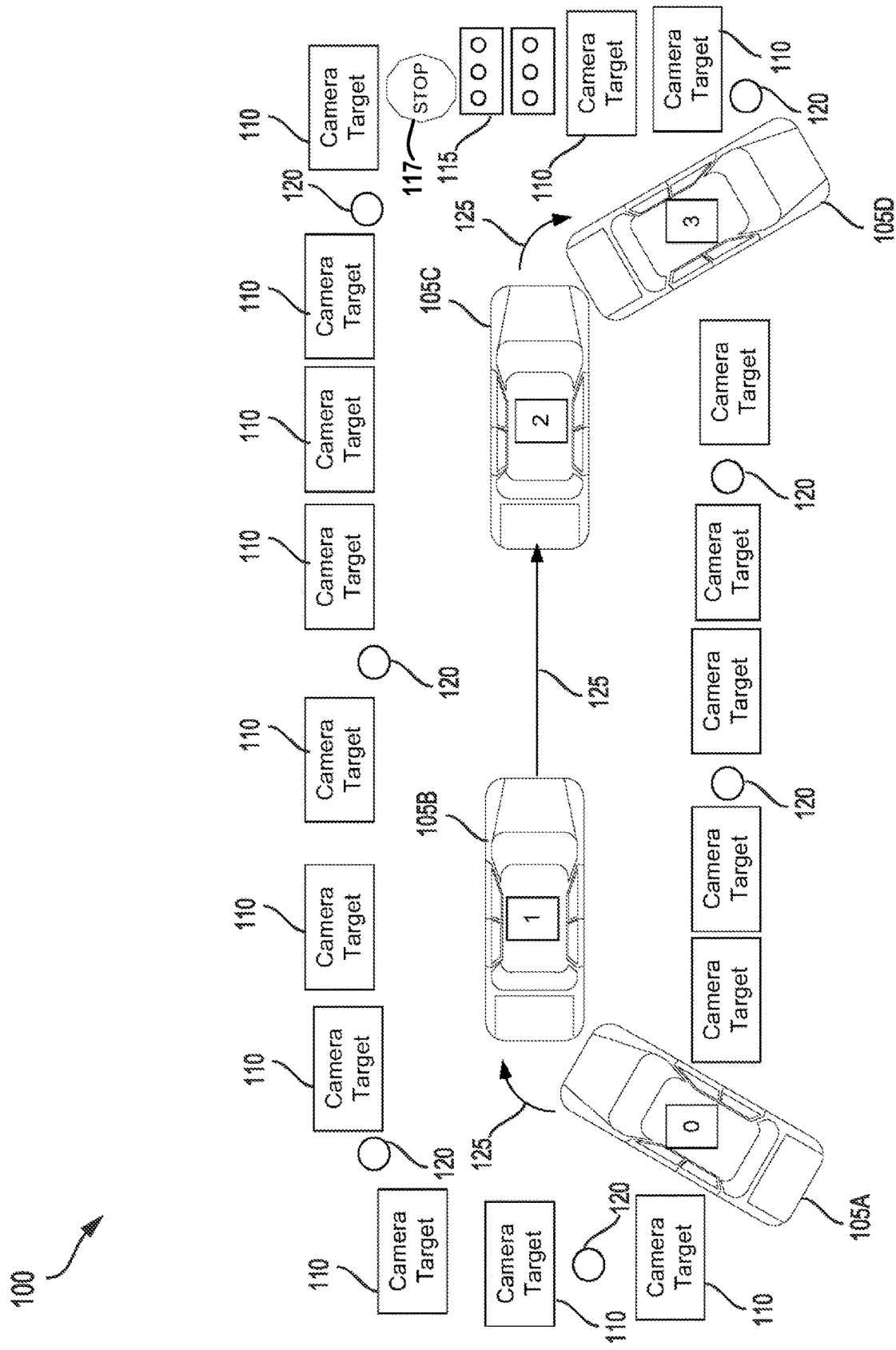
FIG. 1 illustrates an example mapped environment in which a drive-through calibration check process can be implemented, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The disclosed technology addresses the need in the art for a calibration check process of sensors on an autonomous vehicle (AV) via a drive-through environment mapped with a series of targets. Ideally, the calibration of AVs is checked everyday more or less before they are put back into service. The AVs are stored in a parking garage where they charge and offload data during downtimes. The parking garage is space constrained. The disclosed technology provides a calibration checking course in a small area in a parking garage that includes few maneuvers and a short track to test major sensor systems. The checked data is processed in a server that clears the AV for duty.

The targets are used to check the calibration of the sensors on the AV as a quality check before the AV is determined fit to drive autonomously. As such, the disclosed technology is directed at supervising a calibration process that collects data from the sensors on the AV based on exposure to a series of targets or augmented camera targets, such as AprilTag detector nodes, as well as Radio Detection and Ranging (RADAR) targets. The collected data may be used for extrinsic calibration aimed to determine that extrinsic parameters that define the rigid relationship between sensors are in set checker bounds. In some embodiments, the rigid relationship may be that the rotation matrix and translation vector between sensors.

In some examples, (1) odometry performance may be measured against reference trajectories, (2) a reference Light Detection and Ranging (LiDAR) camera/sensor may be calibrated to an AV chassis based on analyzed point cloud data, (3) cameras may be calibrated using target boards to solve for extrinsics, (4) signal cameras may be checked for relative pose error by computing homography between dual traffic lights, (5) RADAR sensors may be checked for alignment, and (6) other LiDAR cameras/sensors may be aligned to a pre-built reference map built by the reference LiDAR camera.

Given that the calibrations on AVs need to be routinely checked and space constraint is an issue, the training techniques and safety score prediction model for an autonomous vehicle of the present technology solves at least these problems and provide other benefits as will be apparent from the figures and description provided herein.

FIG. 1 illustrates an example environment in which a sensor calibration process can be implemented. Environment 100 includes an autonomous vehicle (AV) 105 (in different positions, 105A, 105B, 105C, and 105D) that can collect sensor data, some of which is based on various targets in environment 100. Targets may include a plurality of camera targets 110, stop light targets 115, a stop sign target 117, and RADAR targets 120. As discussed above, sensor data can include data acquired from various AV sensors, including but not limited to one or more LiDAR sensors, RADAR sensors, camera sensors, thermal camera sensors, or the like. Sensor data can be collected by AV 105 at different times along a path 125, such as while driving between position 0 (AV 105A) and position 1 (AV 105B), while driving between position 1 (AV 105B) and position 2 (AV 105C), and between position 2 (AV 105C) and while driving position 3 (AV 105D).

With respect to the environment 100 mapped with various targets, the camera targets 110 may be visually marked with designs that are quickly and accurately detected, such as AprilTag target boards. The location and orientation of the AV 105 (chassis pose) with respect to the targets can be known, and can be used along with the identifications of the targets to optimize extrinsic parameters of the cameras being calibrated to optimize the speed and accuracy of target recognition. The RADAR targets 120 may be placed in known retroreflector locations in the environment 100 to filter noisy return. RADAR clusters may correlate with Density-Based Spatial Clustering of Applications with Noise (DBSCAN) target clusters from the LiDAR cameras to derive yaw offset. The stop light targets 115 may include a dual traffic light set used to compute homography between the two traffic light targets, such that a homography matrix is established to check relative pose error.

By way of example, driving between position 0 (AV 105A) and position 1 (AV 105B) and driving between position 2 (AV 105C) and position 3 (AV 105D) may be used for measuring odometry performance, checking for alignment of the RADAR sensors, and camera calibration using the target boards because these two driving segments include turning maneuvers. Furthermore, the LiDAR calibrations and signal camera checks may be performed during the straight path between position 1 (AV 105B) and position 2 (AV 105C). The shape of the course and corresponding path 125 in FIG. 1 is merely illustrative. The course and corresponding path 125 does not need to be a C-shaped course, as the course can be any shape that includes one or more turns.

Figure 2:
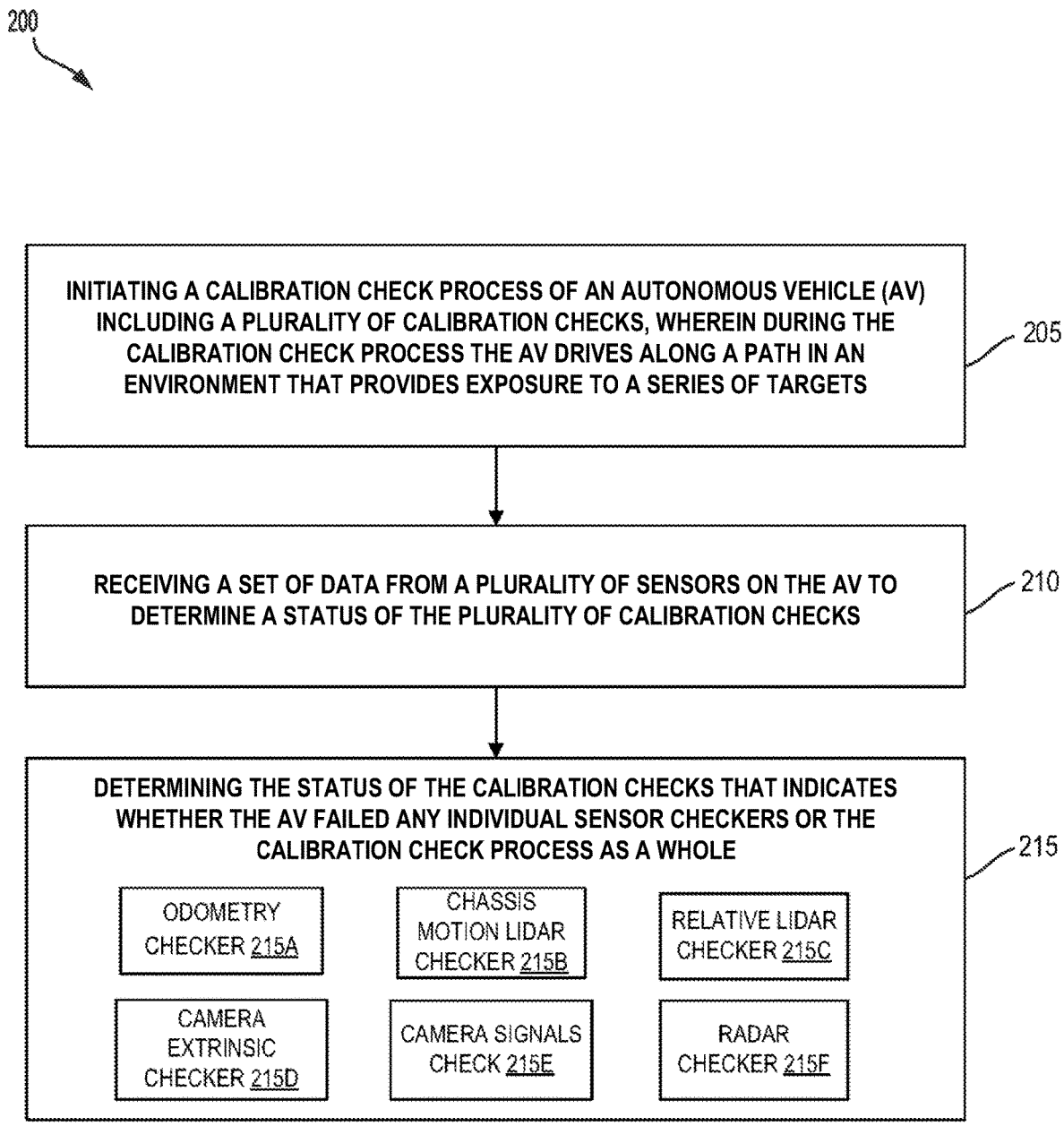
FIG. 2 illustrates an example method for the drive-through calibration check process, according to some examples of the present disclosure.

FIG. 2 illustrates an example method 200 for the drive-through calibration check process. Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

Figure 4:
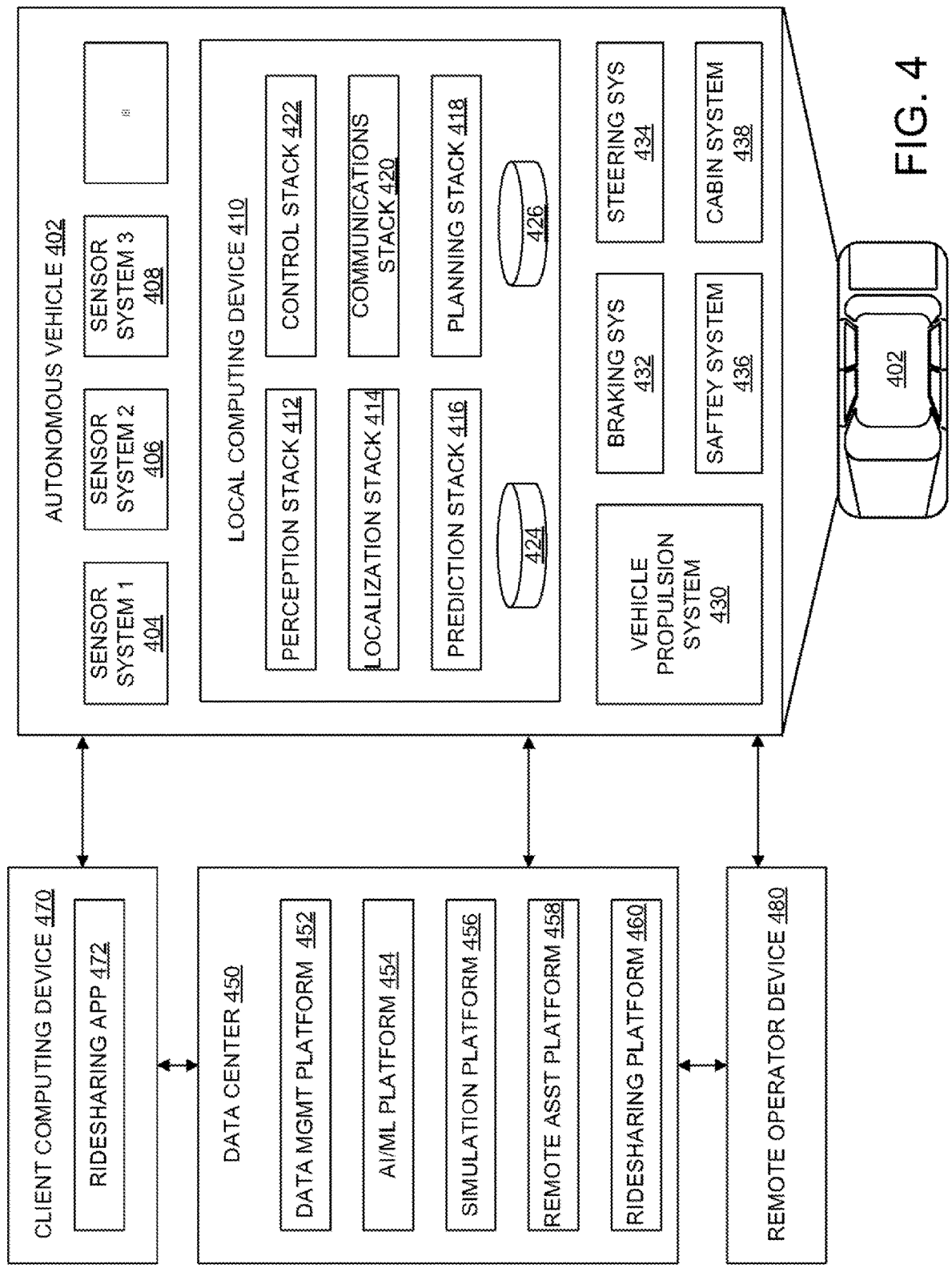
FIG. 4 illustrates an example system environment that can be used to facilitate autonomous vehicle (AV) dispatch and operations, according to some aspects of the disclosed technology.

According to some examples, the method 200 includes initiating a calibration check process of an autonomous vehicle (AV) at block 205. During the calibration check process, the autonomous vehicle drives along a path in a mapped environment that provides exposure to a series of augmented targets. For example, a remote operator device 480, an example of which is illustrated in FIG. 4, may initiate the calibration check process of an AV. In some cases, the calibration check process may also be initiated and overseen by the data center 450, or the autonomous vehicle 402 itself. Furthermore, in some cases, the path may include at least one turn and at least one straight path exceeding a minimum distance (e.g., the bath 125 from FIG. 1). The minimum distance may be approximately 2-3 meters for a straight line so that certain datasets, such as LiDAR data, are sharp enough. In some cases, for the minimum distance, the shorter the distance the slower the required speed limit is for driving along the straight path for capturing the certain datasets.

According to some examples, the method 200 includes receiving a set of data from a plurality of sensors on the AV to determine a status of a plurality of calibration checks at block 210. For example, the remote operator device 480, which is illustrated in FIG. 4, may receive the set of data from the plurality of sensors on the AV to determine the status of the plurality of calibration checks. The plurality of sensors may include motion sensors for modeling odometry, LiDAR sensors for high-definition mapping, object and surround cameras for 360° surround perception and object detection, signal cameras for traffic light detection, and RADAR sensors for vehicle kinematics identification. All of these sensors need to be inspected under various calibration checks before the AV is ready for autonomous driving. In fact, the calibration check process is ideally performed periodically across a fleet of AVs to give continual high-quality assurances of calibration.

According to some examples, the method 200 includes determining the status of the calibration checks indicated by whether the autonomous vehicle failed any individual sensor checkers or the calibration check process as a whole at block 215. For example, the remote operator device 480 illustrated in FIG. 4 may determine the status of the calibration checks indicated by whether the autonomous vehicle failed any individual sensor checkers or the calibration check process. The status may be displayed at an interface for a remote operator. The interface may further include a start calibration button, a stop calibration button, and indications of whether the AV passed or failed any of the plurality of calibration checks and/or a breakdown of whether each sensor passed or failed each of the calibration checks. Detailed description below pertaining to FIG. 3 further illustrates an example interface.

Determining the status of the calibration checks may be based on running one or more of the following: an odometry checker 215A, a chassis motion LiDAR checker 215B, a relative LiDAR checker 215C, a camera extrinsic checker 215D, a camera signals checker 215E, and/or a RADAR checker 215F. The following will describe each of the checkers 215 in more detail.

In some examples, the odometry checker 215A may be initiated for a turning segment of the path of the calibration check process. More specifically, the odometry trajectory may be compared to one or more reference poses from an inertial navigation system (INS). For example, the remote operator device 480 illustrated in FIG. 4 may compare the odometry trajectory to one or more reference poses. If the calibration parameters are incorrect, the odometry would drift beyond the set thresholds. As such, the AV would be prevented from driving autonomously before getting recalibrated. Since the INS and odometry use different reference systems (origin), the odometry trajectory and INS trajectory may be aligned. In particular, the INS provides a smooth localized pose (SLP) of the vehicle in the context of a global frame, whereas the odometry system provides the orientation of the vehicle with reference to the starting point of the AV at the start of the calibration check process. The odometry checker performs an end-to-end test by aligning the odometry trajectory to the SLP trajectory (INS output) and confirms that they are well-aligned based on the observed data. In some examples, a minimum trajectory length is 12 meters, a maximum alignment residual is 0.4 meters, an average alignment residual is 0.2 meters, and a yaw drift/meter is 0.3 deg/meter.

In some examples, the chassis motion LiDAR checker 215B may be initiated for a straight segment of the path of the calibration check process. More specifically, chassis motion of the AV is determined based on the odometry trajectory. Therefore, the chassis motion LiDAR checker 215B passing its calibration check may rely on the odometry check 215A passing as well. In some examples, real-time LiDAR data is received from a reference LiDAR sensor on the AV traveling within a specific speed limit in the straight segment. The real-time LiDAR data may be compared to the chassis motion for determining LiDAR-to-chassis extrinsics of the reference LiDAR sensor. In some examples, the relative LiDAR checker 215C may be initiated for determining a relative alignment of a plurality of LiDAR sensors with respect to the reference LiDAR sensor. This extrinsic is particularly meaningful for localization and mapping, and so the technique may be applied from an offline process to estimate the optimal extrinsic by perturbing the initial transformation until an ideal offset is discovered.

In some examples, the camera extrinsic checker 215D is initiated at the turning segment of the path of the calibration check process. The camera extrinsic checker 215D may evaluate extrinsics, such as rotation and/or translation, of a plurality of cameras on the AV relative to a front central camera. The camera extrinsics checker 215D may include auditing an accuracy of feature point extraction of target boards, including target identifiers by the plurality of cameras. The target boards may be AprilTag boards. Furthermore, chassis poses may be used to initiate target transformation and adjustments are bundled to solve for the extrinsics.

In some examples, the camera signals checker 215E of signal cameras is initiated at the straight segment of the path of the calibration check process. The signal cameras may comprise a hardware filter specific for viewing traffic light bulbs. A dual traffic light target set may be detected a plurality of times during a straight drive portion. Homography may be computed between dual traffic light targets each of the times, such that a homography matrix is established to check relative pose error. In other words, the camera signals checker 215E computes the relative rotation of the two signal cameras to each other using the dual traffic light target at the end of the garage checker tunnel. As such, the camera signals checker 215E detects the 6 lights on the target to compute the homography matrix, which is decomposed to compute the rotation between the two signal cameras.

In some examples, the RADAR checker 215F is initiated at the turn segment and/or straight segment of the path of the calibration check process. An alignment of a plurality of RADAR sensors may be checked by comparing locations of detected target locations in the RADAR sensors against target locations detected by a LiDAR camera on the AV. The target locations are roughly mapped in the environment and each LiDAR and RADAR scan is filtered to only include points around the known locations. With the filtered clouds, a best alignment is searched by performing a grid search on the possible perturbations of the extrinsic. Due to the limitations of the RADAR sensors, yaw may be the only rotational component that is checked.

Figure 3:
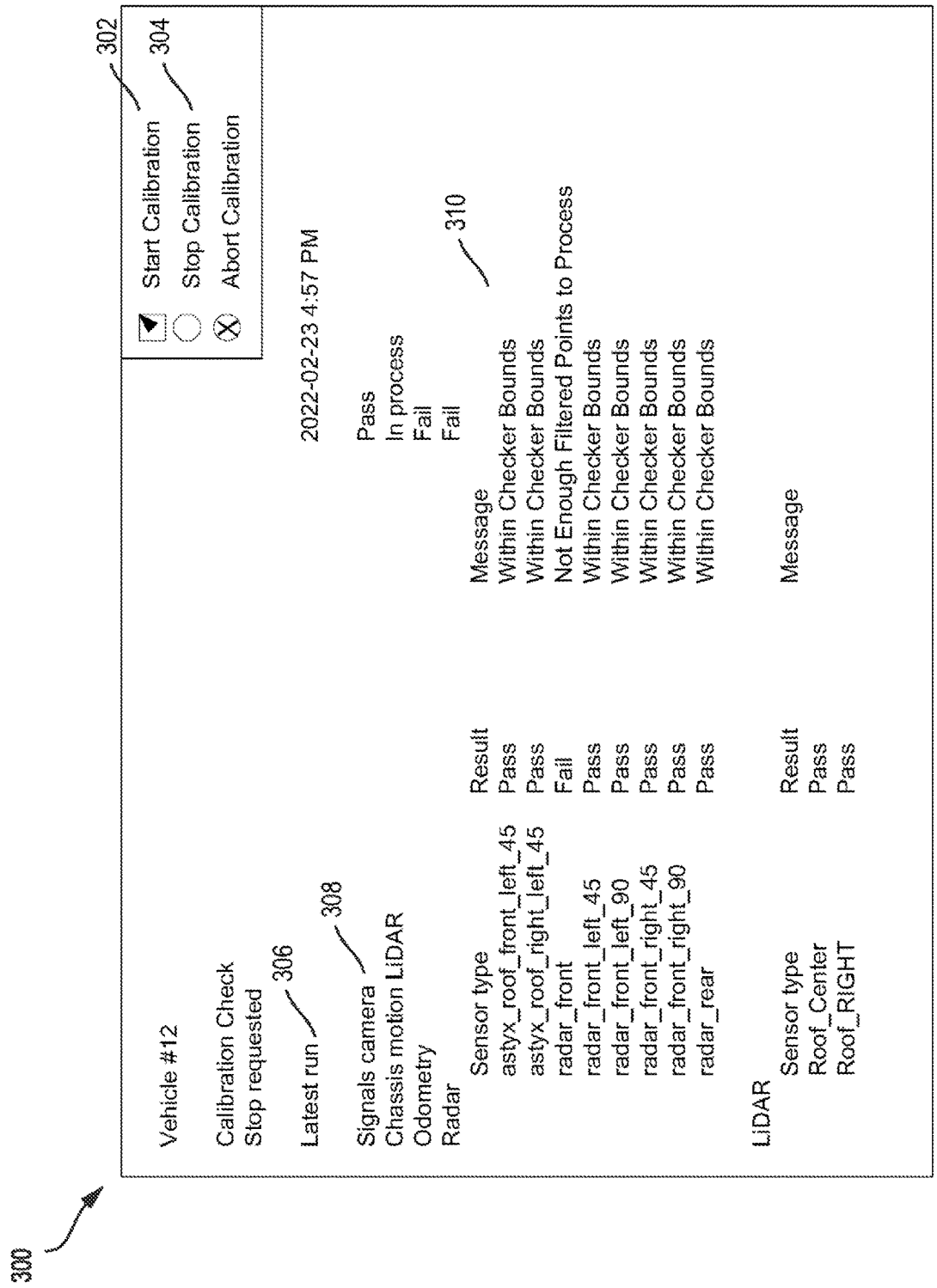
FIG. 3 illustrates an example graphical user interface displaying a remote operation module, according to some examples of the present disclosure.

FIG. 3 illustrates an example graphical user interface 300 displaying a report generated by a remote operation service 482. The remote operation service 482 may locally run at the remote operator device 480, at the data center 450, or in a separate server that the remote operator device 480 accesses. In cases where the connection is poor, it is advantageous to have the remote operation service 482 locally run at the remote operator device 480. The remote operation service 482 may provide a start calibration control 302, a stop calibration control 304, and other controls that remotely control the calibration check process. The AV 402 collects the data and sends the data to the remote operation service 482, and subsequently, the report is generated at the remote operator device 480. In some embodiments, the AV can provide a pass/fail status of each sensor being tested during the calibration process to the remote operation service 482. In some embodiments, the AV can provide sensor output data which can interpreted by remote operation service 482 to determine whether the sensors are properly calibrated.

The graphical user interface 300 further includes information about a latest run 306, such as when was the latest run, which provides an indication of when the AV is due for its next calibration. Each of the checkers 215A-F are listed in a checker list 308 that may include whether or not they passed or failed. Each checker 215A-F can be expanded to show results for each individual sensor 310, with messages that indicate what the issue was if the sensor failed.

The data center 450 or the remote operator service 482, or even the AV 402 itself, can store the records of passing and failing that are accessible by the remote operator device 480. In some cases, the AV 402 is prevented from being allowed to engage in autonomous mode unless there is a record that it passed the checks. In some cases, the AV 402 is checked every day or every couple of days such that results over time are collected. Such results over time can be compared to better predict when there might be a need for service or recalibration.

Turning now to FIG. 4, this figure illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, a wheel braking system (e.g., a disc braking system that utilizes brake pads), hydraulics, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an High Definition (HD) geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image or video data, RADAR data, GPS data, and other sensor data that the data center 450 can use for creating or updating AV geospatial data as discussed further below with respect to FIG. 5 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes one or more of a data management platform 452, an Artificial Intelligence/Machine Learning (AI/ML) platform 454, a simulation platform 456, a remote assistance platform 458, a ridesharing platform 460, and a map management platform 462, among other systems.

Data management platform 452 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, Unmanned Aerial Vehicles (UAVs), satellites, third-party mapping services, and other sources of geospatially referenced data. The raw data can be processed, and map management platform 462 can render base representations (e.g., tiles (2D), bounding volumes (3D), etc.) of the AV geospatial data to enable users to view, query, label, edit, and otherwise interact with the data. Map management platform 462 can manage workflows and tasks for operating on the AV geospatial data. Map management platform 462 can control access to the AV geospatial data, including granting or limiting access to the AV geospatial data based on user-based, role-based, group-based, task-based, and other attribute-based access control mechanisms. Map management platform 462 can provide version control for the AV geospatial data, such as to track specific changes that (human or machine) map editors have made to the data and to revert changes when necessary. Map management platform 462 can administer release management of the AV geospatial data, including distributing suitable iterations of the data to different users, computing devices, AVs, and other consumers of HD maps. Map management platform 462 can provide analytics regarding the AV geospatial data and related data, such as to generate insights relating to the throughput and quality of mapping tasks.

In some embodiments, the map viewing services of map management platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

In some embodiments, a remote operator device 480 may be used to present an interface for a remote operator of the drive-through calibration process. The remote operator device 480 may interface with the data center 450 and/or the AV 402 to perform the various checks and/or to stop and stop the drive-through calibration data collection process performed on the AV 402. As mentioned previously, the remote operation service 482 may locally run at the remote operator device 480, at the data center 450, or in a separate server that the remote operator device 480 accesses.

Figure 5:
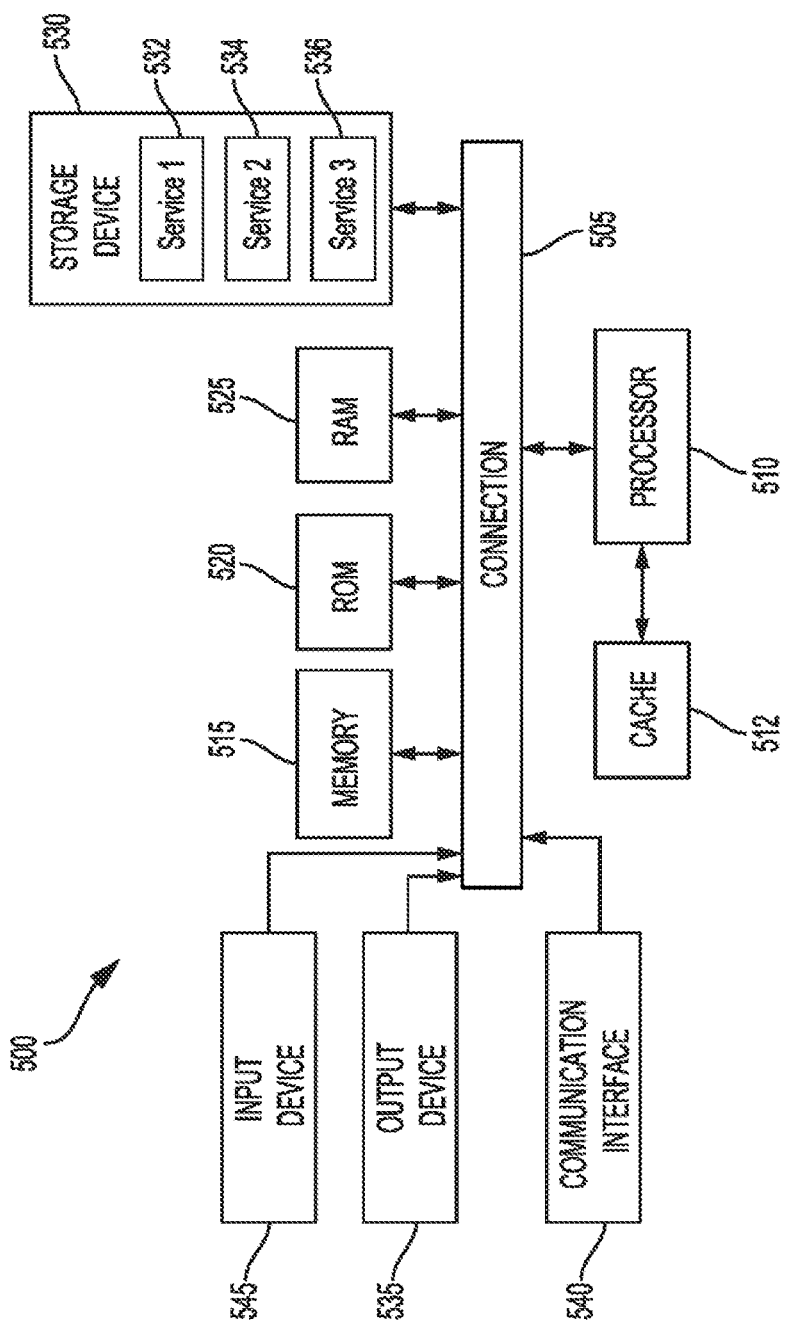
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 605 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLO- NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., that when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Aspect 1. A method comprising: initiating a calibration check process of an autonomous vehicle (AV), wherein during the calibration check process the AV drives along a path in an environment that provides exposure to a series of targets; receiving a set of data from a plurality of sensors on the AV to determine a status of a plurality of calibration checks; and determining the status of the calibration checks indicated by whether the AV failed any individual sensor checkers or the calibration check process as a whole.

Aspect 2. The method of Aspect 1, wherein the path includes at least one turn and at least one straight path exceeding a minimum distance.

Aspect 3. The method of any of Aspects 1 to 2, where the calibration check process is initiated via remote operator, wherein the method further comprising: providing an interface for the remote operator, wherein the interface includes a start calibration button, a stop calibration button, and indications of whether the AV passed or failed any of the plurality of calibration checks and/or a breakdown of whether each sensor passed or failed each of the calibration checks.

Aspect 4. The method of any of Aspects 1 to 3, further comprising: initiating an odometry checker in a turning segment of the path of the calibration check process; comparing an odometry trajectory to one or more reference poses an inertial navigation system (INS); and detecting deviations, including spatial drift and yaw drift, by the odometry trajectory and determining whether the deviations are with a determine bound.

Aspect 5. The method of any of Aspects 1 to 4, further comprising: initiating a chassis motion Light Detection and Ranging (LiDAR) checker in a straight segment of the calibration check process; determining chassis motion based on the odometry trajectory; receiving real-time LiDAR data from a reference LiDAR sensor on the AV traveling within a specific speed limit; and comparing the real-time LiDAR data to the chassis motion for determining LiDAR-to-chassis extrinsics of the reference LiDAR sensor.

Aspect 6. The method of any of Aspects 1 to 5, further comprising: initiating a relative LiDAR checker of the calibration check process; and determining relative alignment of a plurality of LiDAR sensors with the reference LiDAR sensor.

Aspect 7. The method of any of Aspects 1 to 6, further comprising: initiating a camera extrinsics checker in the calibration check process; and evaluating extrinsics, including rotation and translation, of a plurality of cameras on the AV relative to a front central camera.

Aspect 8. The method of any of Aspects 1 to 7, wherein the camera extrinsics checker includes auditing an accuracy of feature point extraction of target boards including target identifiers by the plurality of cameras, wherein chassis poses are used to initiate target transformation and adjustments are bundled to solve for the extrinsics.

Aspect 9. The method of any of Aspects 1 to 8, further comprising: initiating a camera signals checker of signal cameras in the calibration check process, wherein the signal cameras comprise a hardware filter for viewing traffic light bulbs; detecting a dual traffic light target set a plurality of times during a straight drive portion; and computing homography between dual traffic light targets each of the times, wherein a homography matrix is established to check relative pose error.

Aspect 10. The method of any of Aspects 1 to 7, further comprising: initiating a Radio Detection and Ranging (RADAR) checker in the calibration check process; and checking alignment of a plurality of RADAR sensors by comparing locations of detected target locations in the RADAR sensors against target locations detected by a LiDAR camera on the AV.

Aspect 11. A non-transitory computer-readable medium comprising instructions stored thereon, when executed the instructions are effective to cause a system to: initiate a calibration check process of an autonomous vehicle (AV), wherein during the calibration check process the AV drives along a path in an environment that provides exposure to a series of targets; receive a set of data from a plurality of sensors on the AV to determine a status of a plurality of calibration checks; and determine the status of the calibration checks indicated by whether the AV failed any individual sensor checkers or the calibration check process as a whole.

Aspect 12. The non-transitory computer-readable medium of Aspect 11, wherein the path includes at least one turn and at least one straight path exceeding a minimum distance.

Aspect 13. The non-transitory computer-readable medium of any of Aspects 11 to 12, where the calibration check process is initiated via remote operator, wherein the instructions are effective to further cause the system to: provide an interface for the remote operator, wherein the interface includes a start calibration button, a stop calibration button, and indications of whether the AV passed or failed any of the plurality of calibration checks and/or a breakdown of whether each sensor passed or failed each of the calibration checks.

Aspect 14. The non-transitory computer-readable medium of any of Aspects 11 to 13, wherein the instructions are effective to further cause the system to: initiate an odometry checker in a turning segment of the path of the calibration check process; compare an odometry trajectory to one or more reference poses an inertial navigation system (INS); and detect deviations, including spatial drift and yaw drift, by the odometry trajectory and determining whether the deviations are with a determine bound.

Aspect 15. The non-transitory computer-readable medium of any of Aspects 11 to 14, wherein the instructions are effective to further cause the system to: initiate a chassis motion Light Detection and Ranging (LiDAR) checker in a straight segment of the calibration check process; determine chassis motion based on the odometry trajectory; receive real-time LiDAR data from a reference LiDAR sensor on the AV traveling within a specific speed limit; and compare the real-time LiDAR data to the chassis motion for determining LiDAR-to-chassis extrinsics of the reference LiDAR sensor.

Aspect 16. The non-transitory computer-readable medium of any of Aspects 11 to 15, wherein the instructions are effective to further cause the system to: initiate a relative LiDAR checker of the calibration check process; and determine relative alignment of a plurality of LiDAR sensors with the reference LiDAR sensor.

Aspect 17. The non-transitory computer-readable medium of any of Aspects 11 to 16, wherein the instructions are effective to further cause the system to: initiate a camera extrinsics checker in the calibration check process; and evaluate extrinsics, including rotation and translation, of a plurality of cameras on the AV relative to a front central camera.

Aspect 18. A system comprising: at least one processor; and a memory storing computer-readable instructions that, when executed by the at least one processor, cause the system to: initiate a calibration check process of an autonomous vehicle (AV), wherein during the calibration check process the AV drives along a path in an environment that provides exposure to a series of targets; receive a set of data from a plurality of sensors on the AV to determine a status of a plurality of calibration checks including an odometry checker, a chassis motion Light Detection and Ranging (LiDAR) checker, a relative LiDAR checker, a camera extrinsics checker, a camera signals checker, and a Radio Detection and Ranging (RADAR) checker; initiate the odometry checker in a turning segment of the path of the calibration check process; compare an odometry trajectory to one or more reference poses an inertial navigation system (INS); detect deviations, including spatial drift and yaw drift, by the odometry trajectory and determining whether the deviations are with a determine bound; initiate the chassis motion LiDAR checker in a straight segment of the calibration check process; determine chassis motion based on the odometry trajectory; receive real-time LiDAR data from a reference LiDAR sensor on the AV traveling within a specific speed limit; compare the real-time LiDAR data to the chassis motion for determining LiDAR-to-chassis extrinsics of the reference LiDAR sensor; initiate the relative LiDAR checker of the calibration check process; determine relative alignment of a plurality of LiDAR sensors with the reference LiDAR sensor; initiating the camera extrinsics checker in the calibration check process; evaluate extrinsics, including rotation and translation, of a plurality of cameras on the AV relative to a front central camera; initiate the camera signals checker of signal cameras in the calibration check process, wherein the signal cameras comprise a hardware filter for viewing traffic light bulbs; detect a dual traffic light target set a plurality of times during a straight drive portion; compute homography between dual traffic light targets each of the times, wherein a homography matrix is established to check relative pose error; initiate the RADAR checker in the calibration check process; check alignment of a plurality of RADAR sensors by comparing locations of detected target locations in the RADAR sensors against target locations detected by a LiDAR camera on the AV; and determine the status of the calibration checks indicated by whether the AV failed any individual sensor checkers or the calibration check process as a whole.

Aspect 19. The system of Aspect 18, wherein the path includes at least one turn and at least one straight path exceeding a minimum distance.

Aspect 20. The system of any of Aspects 18 to 19, where the calibration check process is initiated via remote operator, wherein the computer-readable instructions that, when executed by the at least one processor, further cause the system to: provide an interface for the remote operator, wherein the interface includes a start calibration button, a stop calibration button, and indications of whether the AV passed or failed any of the plurality of calibration checks and/or a breakdown of whether each sensor passed or failed each of the calibration checks.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A method comprising:
   initiating a calibration check process of an autonomous vehicle (AV) including a plurality of calibration checks, wherein during the calibration check process the AV drives along a path in an environment that provides exposure to a series of targets;
   receiving, by a computing device of the AV, a set of data from a plurality of sensors on the AV to determine a status of the plurality of calibration checks, implemented by the computing device of the AV, including an odometry checker, a chassis motion Light Detection and Ranging (LiDAR) checker, a relative LiDAR checker, a camera extrinsics checker, a camera signals checker, and a Radio Detection and Ranging (RADAR) checker;
   initiating the odometry checker in a turning segment of the path of the calibration check process;
   in response to the initiation, comparing, by the odometry checker, an odometry trajectory to one or more reference poses of an inertial navigation system (INS); and
   based on the comparison, detecting, by the odometry checker, deviations, including spatial drift and yaw drift, by the odometry trajectory and determining whether the deviations are with a determine bound;
   initiating, by the computing device of the AV, the chassis motion LiDAR checker in a straight segment of the calibration check process;
   determining, by the chassis motion LIDAR checker, chassis motion based on the odometry trajectory;
   receiving, by the chassis motion LIDAR checker, real-time LiDAR data from a reference LiDAR sensor on the AV traveling within a specific speed limit;
   comparing, by the chassis motion LIDAR checker, the real-time LiDAR data to the chassis motion for determining LiDAR-to-chassis extrinsics of the reference LiDAR sensor;
   initiating, by the computing device of the AV, the relative LiDAR checker of the calibration check process;
   determining, by the relative LiDAR checker, relative alignment of a plurality of LiDAR sensors with the reference LiDAR sensor;
   initiating, by the computing device of the AV, the camera extrinsics checker in the calibration check process;
   evaluating, by the camera extrinsics checker, extrinsics, including rotation and translation, of a plurality of cameras on the AV relative to a front central camera;
   initiating, by the computing device of the AV, the camera signals checker of signal cameras in the calibration check process, wherein the signal cameras comprise a hardware filter for viewing traffic light bulbs;
   detecting, by the camera signals checker, a dual traffic light target set a plurality of times during a straight drive portion of the calibration check process;
   computing, by the camera signals checker, homography between dual traffic light targets each of the times, wherein a homography matrix is established to check relative pose error;
   initiating, by the computing device of the AV, the RADAR checker in the calibration check process;
   checking, by the RADAR checker, alignment of a plurality of RADAR sensors by comparing locations of detected target locations in the RADAR sensors against target locations detected by a LiDAR sensor on the AV; and
   determining the status of the calibration checks that indicates whether the AV failed any individual sensor checkers or the calibration check process as a whole.

2. The method of claim 1, wherein the path includes at least one turn and at least one straight path exceeding a minimum distance.

3. The method of claim 1, where the calibration check process is initiated via remote operator, wherein the method further comprising:
   providing an interface for the remote operator, wherein the interface includes a start calibration button, a stop calibration button, and indications of whether the AV passed or failed any of the plurality of calibration checks and/or a breakdown of whether each sensor passed or failed each of the calibration checks.

4. A non-transitory computer-readable medium comprising instructions stored thereon, when executed the instructions are effective to cause a system to:
   initiate a calibration check process of an autonomous vehicle (AV) including a plurality of calibration checks, wherein during the calibration check process the AV drives along a path in an environment that provides exposure to a series of targets;
   receive, by a computing device of the AV, a set of data from a plurality of sensors on the AV to determine a status of the plurality of calibration checks, implemented by the computing device of the AV, including an odometry checker, a chassis motion Light Detection and Ranging (LiDAR) checker, a relative LiDAR checker, a camera extrinsics checker, a camera signals checker, and a Radio Detection and Ranging (RADAR) checker;
   initiate the odometry checker in a turning segment of the path of the calibration check process;
   in response to the initiation, compare, by the odometry checker, an odometry trajectory to one or more reference poses of an inertial navigation system (INS); and
   based on the comparison, detect, by the odometry checker, deviations, including spatial drift and yaw drift, by the odometry trajectory and determining whether the deviations are with a determine bound;

initiate, by the computing device of the AV, the chassis motion LiDAR checker in a straight segment of the calibration check process;

determine, by the chassis motion LIDAR checker, chassis motion based on the odometry trajectory;

receive, by the chassis motion LIDAR checker, real-time LiDAR data from a reference LiDAR sensor on the AV traveling within a specific speed limit;

compare, by the chassis motion LIDAR checker, the real-time LiDAR data to the chassis motion for determining LiDAR-to-chassis extrinsics of the reference LiDAR sensor;

initiate, by the computing device of the AV, the relative LiDAR checker of the calibration check process;

determine, by the relative LiDAR checker, relative alignment of a plurality of LiDAR sensors with the reference LiDAR sensor;

initiate, by the computing device of the AV, the camera extrinsics checker in the calibration check process;

evaluate, by the camera extrinsics checker, extrinsics, including rotation and translation, of a plurality of cameras on the AV relative to a front central camera;

initiate, by the computing device of the AV, the camera signals checker of signal cameras in the calibration check process, wherein the signal cameras comprise a hardware filter for viewing traffic light bulbs;

detect, by the camera signals checker, a dual traffic light target set a plurality of times during a straight drive portion of the calibration check process;

compute, by the camera signals checker, homography between dual traffic light targets each of the times, wherein a homography matrix is established to check relative pose error;

initiate, by the computing device of the AV, the RADAR checker in the calibration check process;

check, by the RADAR checker, alignment of a plurality of RADAR sensors by comparing locations of detected target locations in the RADAR sensors against target locations detected by a LiDAR sensor on the AV; and determine the status of the calibration checks that indicates whether the AV failed any individual sensor checkers or the calibration check process as a whole.

5. The non-transitory computer-readable medium of claim 4, wherein the path includes at least one turn and at least one straight path exceeding a minimum distance.

6. The non-transitory computer-readable medium of claim 4, where the calibration check process is initiated via remote operator, wherein the instructions are effective to further cause the system to:

provide an interface for the remote operator, wherein the interface includes a start calibration button, a stop calibration button, and indications of whether the AV passed or failed any of the plurality of calibration checks and/or a breakdown of whether each sensor passed or failed each of the calibration checks.

7. A system comprising:
at least one processor; and
a memory storing computer-readable instructions that, when executed by the at least one processor, cause the system to:

initiate a calibration check process of an autonomous vehicle (AV) including a plurality of calibration checks, wherein during the calibration check process the AV drives along a path in an environment that provides exposure to a series of targets;

receive, by a computing device of the AV, a set of data from a plurality of sensors on the AV to determine a status of the plurality of calibration checks, implemented by the computing device of the AV, including an odometry checker, a chassis motion Light Detection and Ranging (LiDAR) checker, a relative LiDAR checker, a camera extrinsics checker, a camera signals checker, and a Radio Detection and Ranging (RADAR) checker;

initiate the odometry checker in a turning segment of the path of the calibration check process;

in response to the initiation, compare, by the odometry checker, an odometry trajectory to one or more reference poses of an inertial navigation system (INS); and based on the comparison, detect, by the odometry checker, deviations, including spatial drift and yaw drift, by the odometry trajectory and determining whether the deviations are with a determine bound;

initiate, by the computing device of the AV, the chassis motion LiDAR checker in a straight segment of the calibration check process;

determine, by the chassis motion LIDAR checker, chassis motion based on the odometry trajectory;

receive, by the chassis motion LIDAR checker, real-time LiDAR data from a reference LiDAR sensor on the AV traveling within a specific speed limit;

compare, by the chassis motion LIDAR checker, the real-time LiDAR data to the chassis motion for determining LiDAR-to-chassis extrinsics of the reference LiDAR sensor;

initiate, by the computing device of the AV, the relative LiDAR checker of the calibration check process;

determine, by the relative LiDAR checker, relative alignment of a plurality of LiDAR sensors with the reference LiDAR sensor;

initiate, by the computing device of the AV, the camera extrinsics checker in the calibration check process;

evaluate, by the camera extrinsics checker, extrinsics, including rotation and translation, of a plurality of cameras on the AV relative to a front central camera;

initiate, by the computing device of the AV, the camera signals checker of signal cameras in the calibration check process, wherein the signal cameras comprise a hardware filter for viewing traffic light bulbs;

detect, by the camera signals checker, a dual traffic light target set a plurality of times during a straight drive portion of the calibration check process;

compute, by the camera signals checker, homography between dual traffic light targets each of the times, wherein a homography matrix is established to check relative pose error;

initiate, by the computing device of the AV, the RADAR checker in the calibration check process;

check, by the RADAR checker, alignment of a plurality of RADAR sensors by comparing locations of detected target locations in the RADAR sensors against target locations detected by a LiDAR sensor on the AV; and determine, by the computing device of the AV, the status of the calibration checks that indicates whether the AV failed any individual sensor checkers or the calibration check process as a whole.

8. The system of claim 7, wherein the path includes at least one turn and at least one straight path exceeding a minimum distance.

9. The system of claim 7, where the calibration check process is initiated via remote operator, wherein the computer-readable instructions that, when executed by the at least one processor, further cause the system to:

provide an interface for the remote operator, wherein the interface includes a start calibration button, a stop calibration button, and indications of whether the AV passed or failed any of the plurality of calibration checks and/or a breakdown of whether each sensor passed or failed each of the calibration checks.

\* \* \* \* \*